(12) United States Patent
Kataoka

(10) Patent No.: US 12,556,122 B2
(45) Date of Patent: Feb. 17, 2026

(54) INVERTER CIRCUIT AND MOTOR MODULE

(71) Applicant: NIDEC CORPORATION, Kyoto (JP)

(72) Inventor: Kotaro Kataoka, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 358 days.

(21) Appl. No.: 18/278,835

(22) PCT Filed: Jan. 12, 2022

(86) PCT No.: PCT/JP2022/000637
§ 371 (c)(1),
(2) Date: Aug. 24, 2023

(87) PCT Pub. No.: WO2022/181084
PCT Pub. Date: Sep. 1, 2022

(65) Prior Publication Data
US 2024/0128916 A1    Apr. 18, 2024

(30) Foreign Application Priority Data
Feb. 25, 2021  (JP) .................... 2021-028382

(51) Int. Cl.
*H02P 27/14*     (2006.01)
*H02P 29/50*     (2016.01)

(52) U.S. Cl.
CPC .............. *H02P 27/14* (2013.01); *H02P 29/50* (2016.02)

(58) Field of Classification Search
CPC .......... H02P 27/14; H02P 27/08; H02P 29/50; H02M 1/12; H02M 7/5395
See application file for complete search history.

(56) References Cited

U.S. PATENT DOCUMENTS 5,706,186 A  1/1998  Blasko
7,957,160 B2 *  6/2011  Babcock ............... H02M 7/497
                                               363/16

(Continued)

FOREIGN PATENT DOCUMENTS

JP    2006042481    2/2006
JP    2008104327    5/2008

(Continued)

OTHER PUBLICATIONS

"Search Report of Europe Counterpart Application", issued on Jul. 3, 2024, p. 1-p. 10.

(Continued)

*Primary Examiner* — Rina I Duda
(74) *Attorney, Agent, or Firm* — JCIPRNET

(57) ABSTRACT

An inverter circuit includes at least three output terminals, a first input terminal, a second input terminal, and at least three series bodies. A total switching duration and a one-phase fixed duration are present within a single cycle of AC output. The waveform of each phase of an output voltage is such that a shared offset wave is deducted from a sinusoidal waveform. The waveform of the offset wave matches one phase of the sinusoidal waveform, or matches a waveform obtained by shifting the one phase of the sinusoidal waveform in the amplitude direction, during the one-phase fixed duration. During switching between the total switching duration and the one-phase fixed duration, the inclination of the waveform of the offset wave either continuously changes or remains fixed.

13 Claims, 11 Drawing Sheets

(56) References Cited

U.S. PATENT DOCUMENTS

| | | | |
|---|---|---|---|
| 8,963,479 B2 | 2/2015 | Suzuki et al. | |
| 9,093,932 B2 * | 7/2015 | Osaki | H02P 6/28 |
| 9,479,106 B2 * | 10/2016 | Nakai | H02P 21/50 |
| 9,698,722 B2 * | 7/2017 | Loken | H02P 29/68 |
| 9,916,152 B2 | 3/2018 | Smith | |
| 10,241,781 B2 | 3/2019 | Smith | |
| 11,267,503 B2 | 3/2022 | Mori et al. | |
| 2015/0333681 A1 * | 11/2015 | Matsuki | H02P 21/0085 |
| | | | 318/400.02 |

FOREIGN PATENT DOCUMENTS

| | | |
|---|---|---|
| JP | 2012125022 | 6/2012 |
| JP | 2013255305 | 12/2013 |
| JP | 2014087233 | 5/2014 |
| JP | 2019187221 | 10/2019 |
| WO | 2017168522 | 10/2017 |
| WO | 2018131093 | 7/2018 |

OTHER PUBLICATIONS

"International Search Report (Form PCT/ISA/210) of PCT/JP2022/000637", mailed on Mar. 15, 2022, with English translation thereof, pp. 1-4.

* cited by examiner

INVERTER CIRCUIT AND MOTOR MODULE

CROSS-REFERENCE TO RELATED APPLICATIONS

This is the U.S. national stage of application No. PCT/JP2022/000637, filed on Jan. 12, 2022, and priority under 35 U.S.C. § 119(a) and 35 U.S.C. § 365(b) is claimed from Japanese Application No. 2021-028382, filed Feb. 25, 2021; the disclosures of which are incorporated herein by reference.

TECHNICAL FIELD

The present invention relates to an inverter circuit and a motor module.

BACKGROUND ART

An inverter which converts a DC voltage into an alternating current and output a three-phase terminal voltage is known. The inverter disclosed in the related art generates an output waveform by superimposing a waveform on a sinusoidal wave as a DUTY waveform of a PWM signal provided for a high-side switching element of each phase.

However, in the inverter disclosed in the related art, since the waveforms containing non-smooth points are superimposed, the obtained modulation waveform also contains non-differentiable points and does not become a smooth waveform. Accordingly, the output waveform contains many harmonic waves. A non-smooth waveform containing non-differentiable points contains many high-order harmonics, which may cause noise or torque unevenness when driving a motor with an inverter.

SUMMARY

An exemplary inverter circuit of the present invention outputs three or more phases of alternating current output. The inverter circuit includes at least three output terminals, a first input terminal, a second input terminal, and at least three series bodies. The at least three output terminals output three or more phases of output voltage and three or more phases of output current. A first voltage is applied to the first input terminal. A second voltage is applied to the second input terminal. The second voltage is lower than the first voltage. The at least three series bodies have two semiconductor switching elements connected to each other in series. The at least three series bodies are connected to each other in parallel. Each of the at least three series bodies has one end connected to the first input terminal and the other end connected to the second input terminal. Each of the at least three series bodies has a first semiconductor switching element, and a second semiconductor switching element. The first semiconductor switching element is connected to the first input terminal. The second semiconductor switching element is connected to the second input terminal. The first semiconductor switching element and the second semiconductor switching element are connected at a connection point. The connection point in each of the at least three series bodies is connected to the at least three output terminals. The first semiconductor switching element is switched on and off at a frequency higher than a frequency of the alternating current output. The second semiconductor switching element is switched on and off at a frequency higher than the frequency of the alternating current output. A total switching duration and a one-phase fixed duration are provided during one cycle of the alternating current output. During the total switching duration, in all phases, at least one of the first semiconductor switching element and the second semiconductor switching element is switched. During the one-phase fixed duration, in the first semiconductor switching element and the second semiconductor switching element of one phase, one is fixed to be off and the other is fixed to be on, and in the phases other than the one phase, at least one of the first semiconductor switching element and the second semiconductor switching element is switched. A waveform of the output voltage of each phase is a waveform obtained by subtracting a common offset wave from a sinusoidal waveform. The waveform of the offset wave coincides with the sinusoidal waveform of the one phase in the one-phase fixed duration or coincides with a waveform in which the sinusoidal waveform of the one phase is shifted in an amplitude direction. In the waveform of the offset wave, an inclination continuously varies or is constant in switching between the total switching duration and the one-phase fixed duration.

An exemplary motor module of the present invention includes the inverter circuit described above, and an n-phase motor. The n-phase motor is driven by the inverter circuit.

The above and other elements, features, steps, characteristics and advantages of the present disclosure will become more apparent from the following detailed description of the preferred embodiments with reference to the attached drawings.

DESCRIPTION OF EMBODIMENTS

Figure 1:
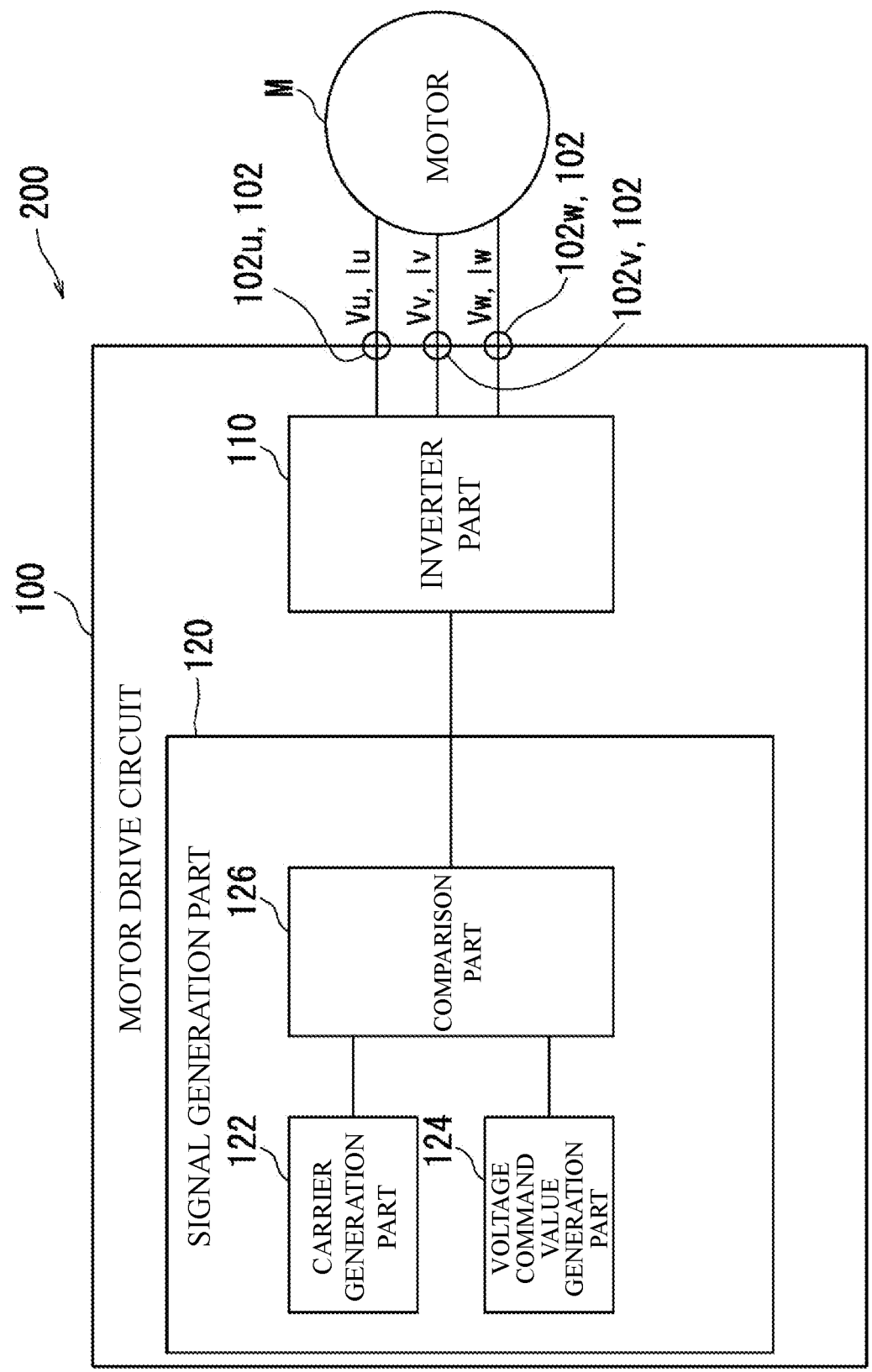
FIG. 1 is a block diagram of a motor module according to an embodiment of the present invention.

Hereinafter, an embodiment of the present invention will be described with reference to the drawings. Note that in the drawings, the same or corresponding parts will be denoted by the same reference signs and description of such parts will not be repeated.

Figure 2:
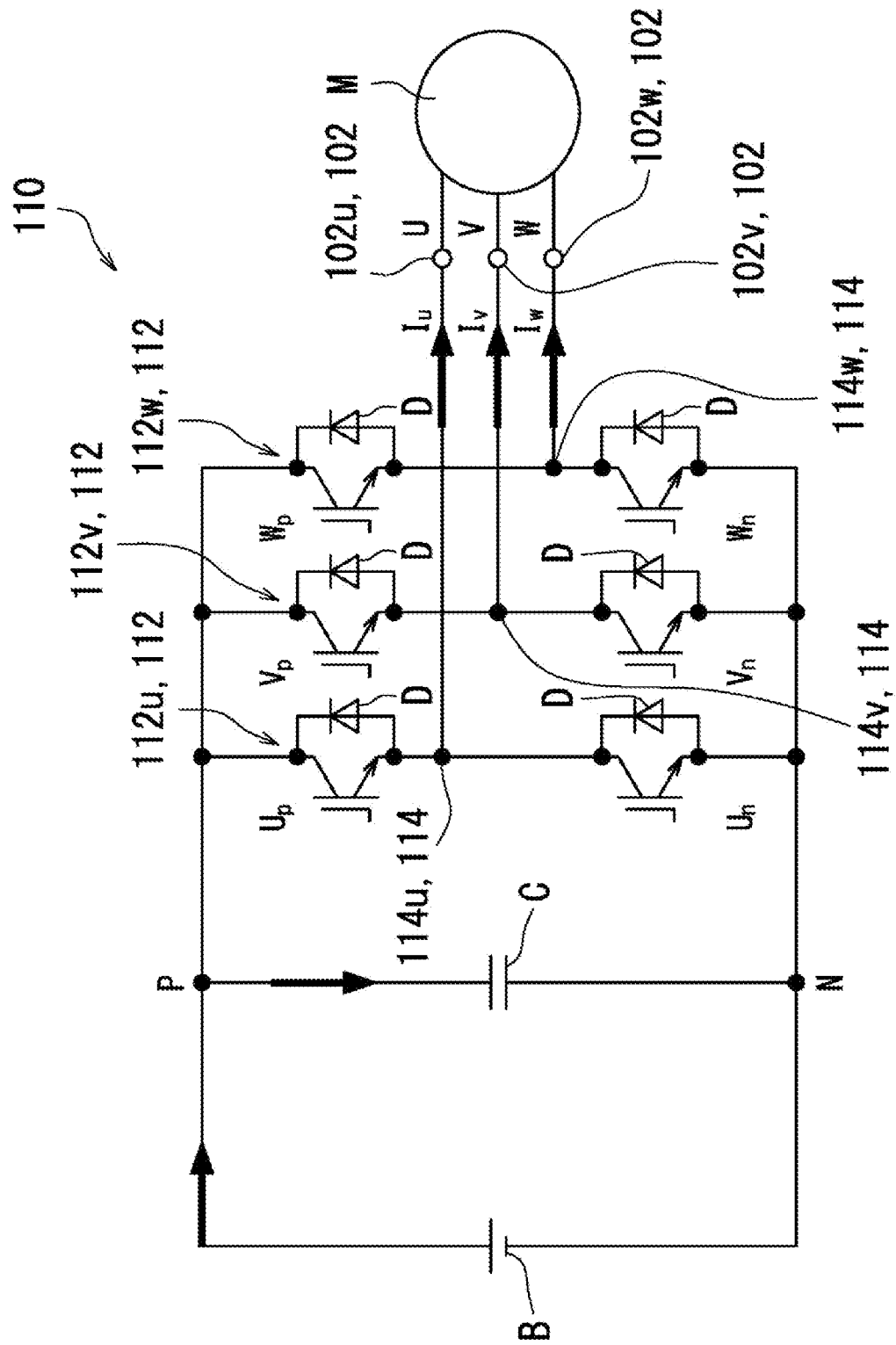
FIG. 2 is a circuit diagram showing an inverter part.

A motor module 200 according to an embodiment of the present invention will be described with reference to FIGS. 1 and 2. FIG. 1 is a block diagram of the motor module 200 according to the embodiment of the present invention. FIG. 2 is a circuit diagram illustrating an inverter part 110.

As illustrated in FIG. 1, the motor module 200 includes a motor drive circuit 100 and a three-phase motor M. The three-phase motor M is driven by the motor drive circuit 100. The three-phase motor M is, for example, a brushless DC motor. The three-phase motor M has a U phase, a V phase, and a W phase. Note that the motor drive circuit 100 corresponds to an example of an "inverter circuit."

The motor drive circuit 100 controls drive of the three-phase motor M in a two-phase modulation manner. The motor drive circuit 100 includes the inverter part 110 and a signal generation part 120.

The motor drive circuit 100 outputs three or more phases of alternating current output. In the embodiment, the motor drive circuit 100 outputs a three-phase alternating current output. The motor drive circuit 100 includes at least three output terminals 102. In the embodiment, the motor drive circuit 100 includes the three output terminals 102. The three output terminals 102 include an output terminal 102u, an output terminal 102v, and an output terminal 102w. The at least three output terminals 102 output three or more phases of output voltage and three or more phases of output current. In the embodiment, the three output terminals 102 output a three-phase output voltage and a three-phase output current to the three-phase motor M. Specifically, the output terminal 102 u outputs a U phase output voltage Vu and a U phase output current Iu to the three-phase motor M. The output terminal 102 v outputs a V phase output voltage Vv and a V phase output current Iv to the three-phase motor M. The output terminal 102w outputs a W phase output voltage Vw and a W phase output current Iw to the three-phase motor M.

As illustrated in FIG. 2, the motor drive circuit 100 includes a first input terminal P, a second input terminal N, a capacitor C, and at least three series bodies 112. In the present embodiment, the motor drive circuit 100 includes the first input terminal P, the second input terminal N, the capacitor C, and three series bodies 112. More specifically, in the present embodiment, the motor drive circuit 100 includes the inverter part 110, and the inverter part 110 includes the first input terminal P, the second input terminal N, the capacitor C, and the three series bodies 112. The inverter part 110 further includes a DC voltage source B. Note that the DC voltage source B may be outside the inverter part 110.

A first voltage V1 is applied to the first input terminal P. The first input terminal P is connected to the DC voltage source B.

A second voltage V2 is applied to the second input terminal N. The second input terminal N is connected to the DC voltage source B. The second voltage V2 is lower than the first voltage V1.

The capacitor C is connected between the first input terminal P and the second input terminal N.

Two semiconductor switching elements are connected in series to the three series bodies 112. The semiconductor switching element is, for example, an insulated gate bipolar transistor (IGBT). Note that the semiconductor switching element may be another transistor such as a field effect transistor. The three series bodies 112 include a series body 112u, a series body 112v, and a series body 112w. The three series bodies 112 are connected in parallel to one another. One end of each of the three series bodies 112 is connected to the first input terminal P. The other end of each of the three series bodies 112 is connected to the second input terminal N. A rectifier element D is connected in parallel to each of these semiconductor switching elements with the first input terminal P side (the upper side in the drawing) as a cathode and the second input terminal N side (the lower side in the drawing) as an anode. In a case where a field effect transistor is used as the semiconductor switching element, a parasitic diode may be used as this rectifier element.

Each of the three series bodies 112 includes a first semiconductor switching element and a second semiconductor switching element. Specifically, the series body 112u includes a first semiconductor switching element Up and a second semiconductor switching element Un. The series body 112v includes a first semiconductor switching element Vp and a second semiconductor switching element Vn. The series body 112w includes a first semiconductor switching element Wp and a second semiconductor switching element Wn.

The first semiconductor switching element Up, the first semiconductor switching element Vp, and the first semiconductor switching element Wp are connected to the first input terminal P. In other words, the first semiconductor switching element Up, the first semiconductor switching element Vp, and the first semiconductor switching element Wp are high-voltage-side semiconductor switching elements.

The second semiconductor switching element Un, the second semiconductor switching element Vn and the second semiconductor switching element Wn are connected to the second input terminal N. In other words, the second semiconductor switching element Un, the second semiconductor switching element Vn and the second semiconductor switching element Wn are low-voltage-side semiconductor switching elements.

The first semiconductor switching element and the second semiconductor switching element are connected at a connection point 114. Specifically, the first semiconductor switching element Up and the second semiconductor switching element Un are connected at a connection point 114u. The first semiconductor switching element Vp and the second semiconductor switching element Vn are connected at a connection point 114v. The first semiconductor switching element Wp and the second semiconductor switching element Wn are connected at a connection point 114w.

The connection point 114 in each of the three series bodies 112 is connected to the three output terminals 102. Specifically, the connection point 114u in the series body 112u is connected to the output terminal 102u. The connection point 114v in the series body 112v is connected to the output terminal 102v. The connection point 114w in the series body 112w is connected to the output terminal 102w.

A PWM signal is input to the first semiconductor switching element Up, the first semiconductor switching element Vp, and the first semiconductor switching element Wp. The PWM signal is output from the signal generation part 120. Hereinafter, in the present description, the PWM signal input to the first semiconductor switching element Up may be referred to as an "UpPWM signal." In addition, the PWM signal input to the first semiconductor switching element Vp may be referred to as a "VpPWM signal." The PWM signal input to the first semiconductor switching element Wp may be referred to as a "WpPWM signal." The first semiconductor switching element Up, the first semiconductor switching element Vp, and the first semiconductor switching element Wp are switched on and off at a frequency higher than the frequency of the AC output. For example, the first semiconductor switching element Up, the first semiconductor switching element Vp, and the first semiconductor switching element Wp are turned on when the UpPWM signal, the VpPWM signal, and the WpPWM signal are at a HIGH level, respectively. On the other hand, the first semiconductor switching element Up, the first semiconductor switching element Vp, and the first semiconductor switching element Wp are turned off when the UpPWM signal, the VpPWM signal, and the WpPWM signal are at a LOW level, respectively.

A PWM signal is input to the second semiconductor switching element Un, the second semiconductor switching element Vn, and the second semiconductor switching element Wn. The PWM signal is output from the signal generation part 120. Hereinafter, in the present description, the PWM signal input to the second semiconductor switching element Un may be referred to as an "UnPWM signal." In addition, the PWM signal input to the second semiconductor switching element Vn may be referred to as a "VnPWM signal." The PWM signal input to the second semiconductor switching element Wn may be referred to as a "WnPWM signal." The second semiconductor switching element Un, the second semiconductor switching element Vn, and the second semiconductor switching element Wn are switched on and off at a frequency higher than the frequency of the AC output. For example, the second semiconductor switching element Un, the second semiconductor switching element Vn, and the second semiconductor switching element Wn are turned on when the UnPWM signal, the VnPWM signal, and the WnPWM signal are at the HIGH level, respectively. On the other hand, the second semiconductor switching element Un, the second semiconductor switching element Vn, and the second semiconductor switching element Wn are turned off when the UnPWM signal, the VnPWM signal, and the WnPWM signal are at the LOW level, respectively.

As illustrated in FIG. 1, the signal generation part 120 includes a carrier generation part 122, a voltage command value generation part 124, and a comparison part 126. The signal generation part 120 is a hardware circuit including a processor such as a central processing part (CPU) and an application specific integrated circuit (ASIC). Then, a processor of the signal generation part 120 functions as the carrier generation part 122, the voltage command value generation part 124, and the comparison part 126 by executing a computer program stored in a storage device.

The signal generation part 120 controls the inverter part 110. Specifically, the signal generation part 120 controls the inverter part 110 by generating a PWM signal and outputting the PWM signal. More specifically, the signal generation part 120 generates a PWM signal to be input to each of the three series bodies 112.

The carrier generation part 122 generates a carrier signal. The carrier signal is, for example, a triangular wave. Note that the carrier signal may be a sawtooth wave.

The voltage command value generation part 124 generates a voltage command value. The voltage command value corresponds to a voltage value output from the motor drive circuit 100. That is, the voltage command value generation part 124 generates, as the voltage command value, a voltage value corresponding to an output voltage Vu, an output voltage Vv, and an output voltage Vw.

The comparison part 126 generates a PWM signal by comparing a carrier signal with a voltage command value.

Figure 3:
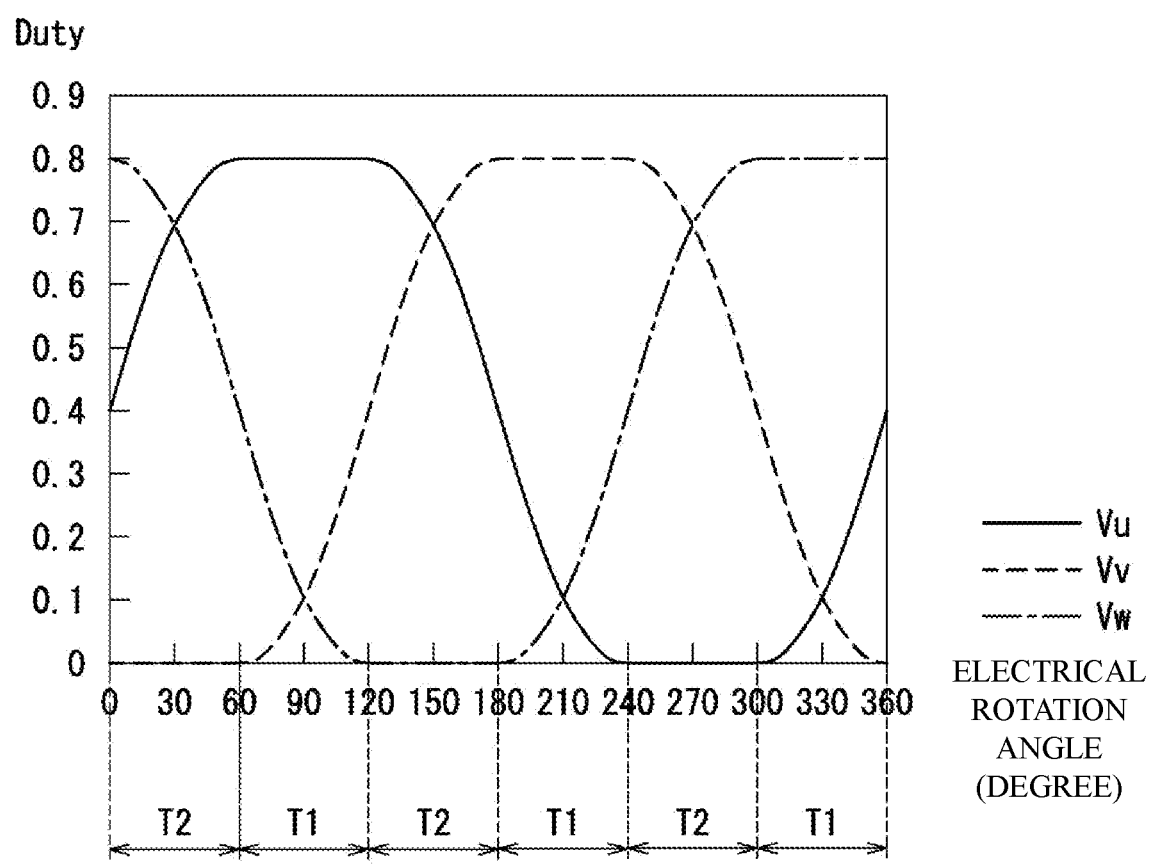
FIG. 3 is a view showing an output voltage, an output voltage and an output voltage.

Next, an output voltage will be described with reference to FIG. 3. FIG. 3 is a view showing the output voltage Vu, the output voltage Vv and the output voltage Vw. In FIG. 3, the output voltage Vu is shown by a solid line, the output voltage Vv is shown by a broken line, and the output voltage Vw is shown by a one-dot chain line. A vertical axis of FIG. 3 represents a voltage value normalized by an input voltage V1-V2, and the output voltage of each phase has a value in a range of 0 to 1. In addition, this value also represents a duty value, which is a ratio of ON time of the first semiconductor switching element of each phase to a PWM cycle. When the second semiconductor switching element is switched, a value obtained by subtracting the value of the vertical axis from 1 becomes the ratio of ON time of the second semiconductor switching element to the PWM cycle. When both the first semiconductor switching element and the second semiconductor switching element are switched, switching is performed complementarily after providing an appropriate dead time in order to prevent both from being turned on simultaneously. The horizontal axis in FIG. 3 represents an electrical rotation angle of the motor, and the unit is degree.

As shown in FIG. 3, a total switching duration T1 and a one-phase fixed duration T2 are provided during one cycle of the alternating current output.

During the total switching duration T1, in all phases, at least one of the first semiconductor switching element and the second semiconductor switching element is switched. In the embodiment, during the total switching duration T1, in all the U phase, the V phase and the W phase, at least one of the first semiconductor switching element and the second semiconductor switching element is switched. Here, in the total switching duration T1, electrical rotation angles are 60 degrees to 120 degrees, 180 degrees to 240 degrees and 300 degrees to 360 degrees.

During the one-phase fixed duration T2, at least one of the first semiconductor switching element and the second semiconductor switching element of one phase is fixed to be off and the other is fixed to be on, and at least one of the first semiconductor switching element and the second semiconductor switching element is switched in phases other than the one phase. Here, in the one-phase fixed duration T2, electrical rotation angles are 0 degree to 60 degrees, 120 degrees to 180 degrees and 240 degrees to 300 degrees. Here, in the one-phase fixed duration T2, one phase is continuously ON.

For example, when the electrical rotation angle is 0 degree to 60 degrees, one of the first semiconductor switching element Vp and the second semiconductor switching element Vn of the V phase is fixed to be off and the other is fixed to be on. In addition, when the electrical rotation angle is 0 degree to 60 degrees, at least one of the first semiconductor switching element (the first semiconductor switching element Up and the first semiconductor switching element Wp) and the second semiconductor switching element (the second semiconductor switching element Un and the second semiconductor switching element Wn) in the U phase and the W phase is switched.

For example, when the electrical rotation angle is 120 degrees to 180 degrees, in the first semiconductor switching element Wp and the second semiconductor switching element Wn of the W phase, one is fixed to be off and the other is fixed to be on. In addition, when the electrical rotation angle is 120 degrees to 180 degrees, at least one of the first semiconductor switching element (the first semiconductor switching element Up and the first semiconductor switching element Vp) and the second semiconductor switching element (the second semiconductor switching element Un and the second semiconductor switching element Vn) in the U phase and the V phase is switched.

For example, when the electrical rotation angle is 240 degrees to 300 degrees, in the first semiconductor switching element Up and the second semiconductor switching element Un of the U phase, one is fixed to be off and the other is fixed to be on. In addition, when the electrical rotation angle is 240 degrees to 300 degrees, at least one of the first semiconductor switching element (the first semiconductor switching element Vp and the first semiconductor switching element Wp) and the second semiconductor switching element (the second semiconductor switching element Vn and the second semiconductor switching element Wn) in the V phase and the W phase is switched.

Figure 4A:
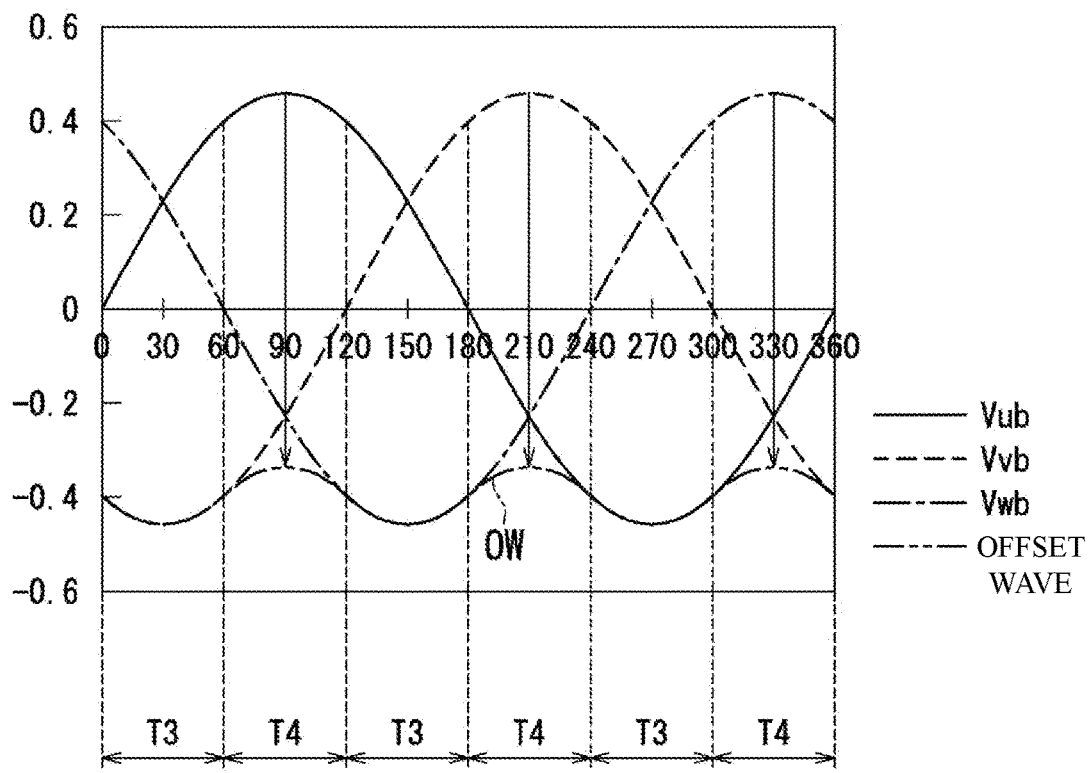
FIG. 4A is a view showing a sinusoidal waveform, a sinusoidal waveform, a sinusoidal waveform and an offset wave.
Figure 4B:
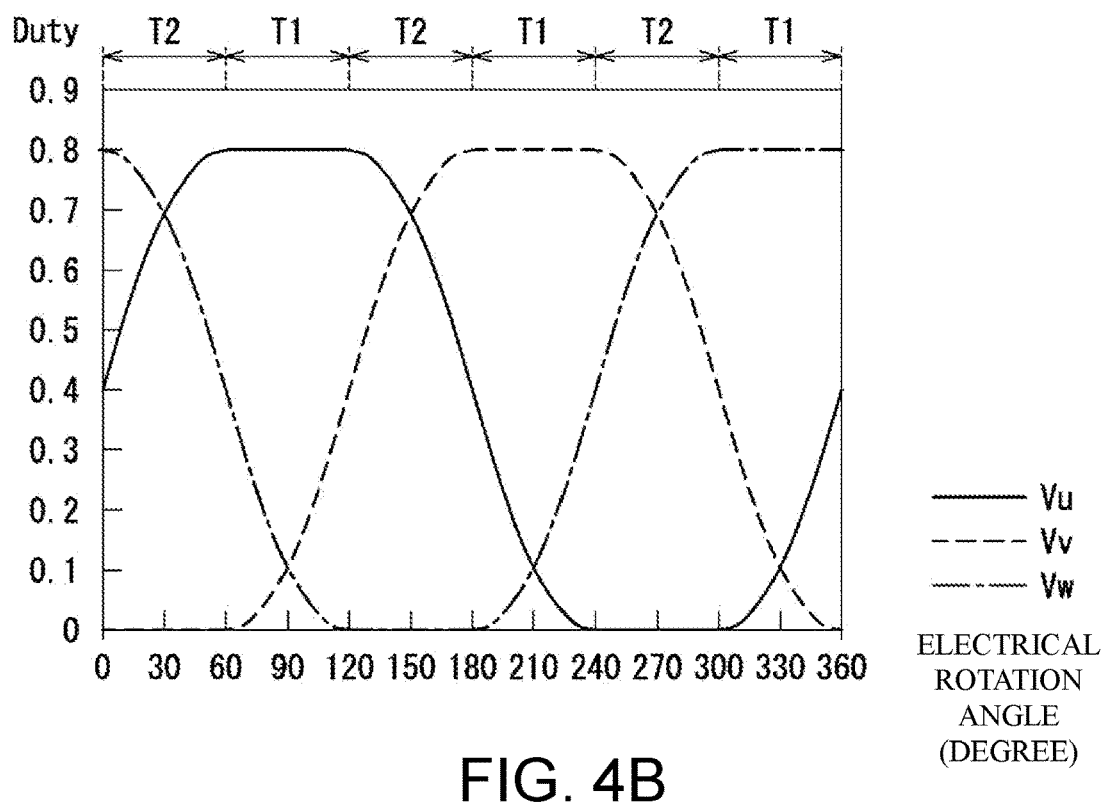
FIG. 4B is a view showing an output voltage, an output voltage and an output voltage after modulation.

An output voltage will be further described with reference to FIG. 4A and FIG. 4B. FIG. 4A is a view showing a sinusoidal waveform Vub, a sinusoidal waveform Vvb, a sinusoidal waveform Vwb and an offset wave OW. FIG. 4B is a view showing the output voltage Vu, the output voltage Vv and the output voltage Vw after modulation.

As shown in FIG. 4A, the sinusoidal waveform Vub, the sinusoidal waveform Vvb, and the sinusoidal waveform Vwb are sinusoidal. The sinusoidal waveform Vvb is deviated in phase by 120 degrees with respect to the sinusoidal waveform Vub. The sinusoidal waveform Vwb is deviated in phase by 120 degrees with respect to the sinusoidal waveform Vvb. The sinusoidal waveform Vub is deviated in phase by 120 degrees with respect to the sinusoidal waveform Vwb.

A waveform of the output voltage of each phase is a waveform obtained by subtracting the common offset wave OW from the sinusoidal waveform (the sinusoidal waveform Vub, the sinusoidal waveform Vvb, and the sinusoidal waveform Vwb).

The offset wave OW coincides with a sinusoidal waveform of one phase in the one-phase fixed duration T2. Specifically, when the electrical rotation angle is 0 degree to 60 degrees, the offset wave OW coincides with a V phase sinusoidal waveform. When the electrical rotation angle is 120 degrees to 180 degrees, the offset wave OW coincides with a W phase sinusoidal waveform. When the electrical rotation angle is 240 degrees to 300 degrees, the offset wave OW coincides with the U phase sinusoidal waveform. Note that the offset wave OW does not completely coincide with a one-phase sinusoidal waveform in the one-phase fixed duration T2. For example, the offset wave OW may be slightly deviated from a one-phase sinusoidal waveform in the one-phase fixed duration T2.

A cycle of the offset wave OW is 1/n of a cycle of the sinusoidal waveform. Here, n is the number of phases of the alternating current output. In the embodiment, the number of phases of the alternating current output is 3. Accordingly, the cycle of the offset wave OW is ⅓ of the cycle of the sinusoidal waveform. That is, the cycle of the offset wave OW is 120 degrees.

In switching of the total switching duration T1 and the one-phase fixed duration T2, the inclination is varied continuously or the inclination is constant. In other words, the output voltage Vu, the output voltage Vv and the output voltage Vw are differentiable. Further, in other words, the output voltage Vu, the output voltage Vv and the output voltage Vw are smooth curves. That is, the output voltage Vu, the output voltage Vv and the output voltage Vw are rounded curves. Note that, as shown in FIG. 4B, the output voltage Vu, the output voltage Vv and the output voltage Vw may partially contain linear portions. In this case, the linear portions and the curved portions are smoothly connected.

The waveform of the offset wave OW has a minimum coincidence duration T3 and a maximum calculation duration T4.

In the minimum coincidence duration T3, the waveform of the offset wave OW coincides with the minimum sinusoidal waveform of the sinusoidal waveform of each phase. Note that the offset wave OW may not completely coincide with the minimum sinusoidal waveform of the sinusoidal waveform of each phase in the minimum coincidence duration T3. For example, the offset wave OW may be slightly deviated from the minimum sinusoidal waveform of the sinusoidal waveform of each phase in the minimum coincidence duration T3. In the embodiment, in the minimum coincidence duration T3, the electrical rotation angles are 0 degree to 60 degrees, 120 degrees to 180 degrees and 240 degrees to 300 degrees. In the embodiment, the minimum coincidence duration T3 has the same duration as the one-phase fixed duration T2. Specifically, when the electrical rotation angle is 0 degree to 60 degrees, the offset wave OW coincides with the sinusoidal waveform Vvb, which is the minimum sinusoidal waveform of each phase. When the electrical rotation angle is 120 degrees to 180 degrees, the offset wave OW coincides with the sinusoidal waveform Vwb, which is the minimum sinusoidal waveform of each phase. When the electrical rotation angle is 240 degrees to 300 degrees, the offset wave OW coincides with the sinusoidal waveform Vub, which is the minimum sinusoidal waveform of each phase.

In the maximum calculation duration T4, the waveform of the offset wave OW is calculated from the maximum sinusoidal waveform of the sinusoidal waveform of each phase. In the embodiment, in the maximum calculation duration T4, the electrical rotation angles are 60 degrees to 120 degrees, 180 degrees to 240 degrees and 300 degrees to 360 degrees. In the embodiment, the maximum calculation duration T4 is the same duration as the total switching duration T1.

Specifically, when the electrical rotation angle is 60 degrees to 120 degrees, the offset wave OW is calculated from the maximum sinusoidal waveform Vub of the sinusoidal waveform of each phase. More specifically, when the electrical rotation angle is 60 degrees to 120 degrees, the offset wave OW is a waveform obtained by shifting the maximum sinusoidal waveform Vub of the sinusoidal waveform of each phase by 0.8 (=amplitude×√3).

When the electrical rotation angle is 180 degrees to 240 degrees, the offset wave OW is calculated from the maximum sinusoidal waveform Vvb of the sinusoidal waveform of each phase. More specifically, when the electrical rotation angle is 180 degrees to 240 degrees, the offset wave OW is a waveform obtained by shifting the maximum sinusoidal waveform Vvb of the sinusoidal waveform of each phase by 0.8 (=amplitude×√3).

When the electrical rotation angle is 300 degrees to 360 degrees, the offset wave OW is calculated from the maximum sinusoidal waveform Vwb of the sinusoidal waveform of each phase. More specifically, when the electrical rotation angle is 300 degrees to 360 degrees, the offset wave OW is a waveform obtained by shifting the maximum sinusoidal waveform Vwb of the sinusoidal waveform of each phase by 0.8 (=amplitude×√3).

In this way, the offset wave OW is derived using any sinusoidal waveform before modulation for each electrical rotation angle range. For example, in the embodiment, when the electrical rotation angles are 0 degree to 60 degrees, 120 degrees to 180 degrees and 240 degrees to 300 degrees, among the sinusoidal waves of each phase, the minimum wave is taken as the modulation wave. In addition, in another section (when the electrical rotation angles are 60 degrees to 120 degrees, 180 degrees to 240 degrees and 300 degrees to 360 degrees), modulation waves are obtained by shifting the maximum sinusoidal wave of each phase by 0.8 (=amplitude×√3).

In the embodiment, when the electrical rotation angles are 60 degrees, 120 degrees, 180 degrees, 240 degrees, 300 degrees and 360 degrees, the minimum sinusoidal wave and the maximum sinusoidal wave are switched. When the electrical rotation angles are 60 degrees, 120 degrees, 180 degrees, 240 degrees, 300 degrees and 360 degrees, the inclination of the minimum sinusoidal wave is equal to the inclination of the maximum sinusoidal wave. Accordingly, when the electrical rotation angles are 60 degrees, 120 degrees, 180 degrees, 240 degrees, 300 degrees and 360 degrees, the minimum sinusoidal wave and the maximum sinusoidal wave are able to be smoothly connected by shifting the maximum sinusoidal wave by 0.8 (=amplitude×√3).

Hereinabove, as described with reference to FIG. 1 to FIG. 4B, the offset wave OW coincides with the one-phase sinusoidal waveform in the one-phase fixed duration T2. In addition, in switching between the total switching duration T1 and the one-phase fixed duration T2, the inclination is continuously varied or the inclination is fixed. Accordingly, the high-order harmonics contained in the output are able to be suppressed and high quality alternating current having small noise ingredient is able to be output while reducing the number of times switching is performed. When the motor is driven by the alternating current output, operations of the motor are able to be stabilized.

In addition, the cycle of the offset wave OW is 1/n of the cycle of the sinusoidal waveform (the sinusoidal waveform Vub, the sinusoidal waveform Vvb and the sinusoidal waveform Vwb). Here, n is the number of phases of the alternating current output. Accordingly, the waveform of the output voltage of each phase becomes the same, and operations of the motor are able to be stabilized.

In addition, the waveform of the offset wave OW has the minimum coincidence duration T3 and the maximum calculation duration T4. The minimum coincidence duration T3 coincides with the minimum sinusoidal waveform of the sinusoidal waveform of each phase. The maximum calculation duration T4 is calculated from the maximum sinusoidal waveform of the sinusoidal waveform of each phase. Accordingly, calculation of the offset wave OW is facilitated.

The waveform of the offset wave OW described with reference to FIG. 3, FIG. 4A and FIG. 4B is switched from the minimum sinusoidal waveform to the maximum sinusoidal waveform when the electrical rotation angles are 60 degrees, 120 degrees, 180 degrees, 240 degrees, 300 degrees and 360 degrees. That is, in the motor drive circuit 100 with reference to FIG. 1 to FIG. 4B, at the electrical rotation angle where the inclination of the minimum sinusoidal waveform coincides with the maximum sinusoidal waveform, the waveform is switched from the minimum sinusoidal waveform to the maximum sinusoidal waveform. However, the present invention is not limited thereto. For example, the waveform of the offset wave OW may be switched from the minimum sinusoidal waveform to the maximum sinusoidal waveform when the electrical rotation angles are angles different from 60 degrees, 120 degrees, 180 degrees, 240 degrees, 300 degrees and 360 degrees.

Figure 5:
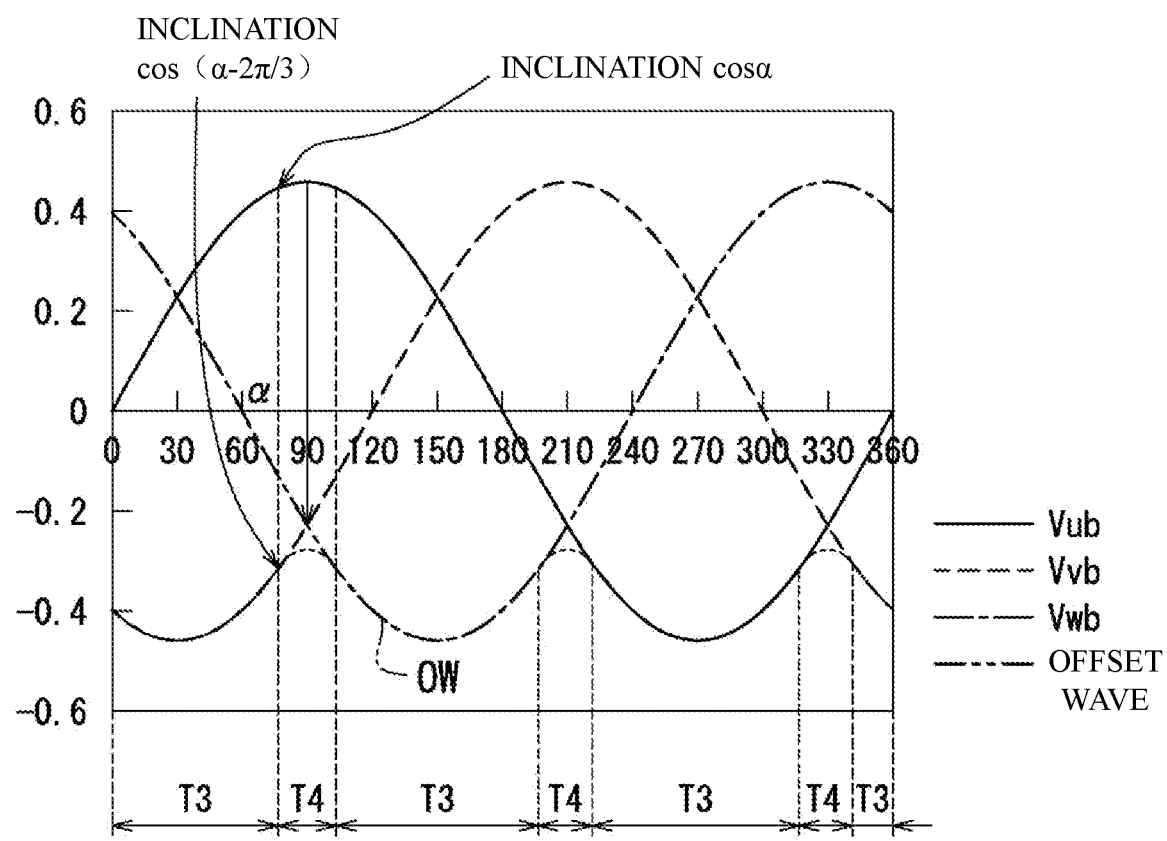
FIG. 5 is a view showing a sinusoidal waveform, a sinusoidal waveform, a sinusoidal waveform and an offset wave.

Another example of the offset wave OW will be described with reference to FIG. 5. FIG. 5 is a view showing the sinusoidal waveform Vub, the sinusoidal waveform Vvb, the sinusoidal waveform Vwb and the offset wave OW.

As shown in FIG. 5, the inclination of the minimum sinusoidal waveform Vvb is $\cos(\alpha-2\pi/3)$ at an angle $\alpha$. In addition, the inclination of the maximum sinusoidal waveform Vub is $\cos \alpha$ at the angle $\alpha$. The inclination of the minimum sinusoidal waveform Vvb is different from the inclination of the maximum sinusoidal waveform Vub at the angle $\alpha$. Accordingly, if the maximum sinusoidal waveform Vub is multiplied by K and then spliced to the minimum sinusoidal waveform Vvb, the offset wave OW is smoothly connected.

The offset wave OW is switched from the minimum sinusoidal waveform Vvb to a waveform obtained by multiplying the maximum sinusoidal waveform Vub by k at the angle $\alpha$ where the inclination of the minimum sinusoidal waveform Vvb is K times the inclination of the maximum sinusoidal waveform Vub with respect to the 3-phase waveform, $A \cdot \sin \theta$, $A \cdot \sin(\theta-2\pi/3)$, and $A \cdot \sin(\theta+2\pi/3)$. Here, A is amplitude.

That is, $K \cdot \cos \alpha = \cos(\alpha-2\pi/3)$.

[Math. 1]

$$\cos\alpha = \left\{\frac{\sqrt{3}}{2K+1}\right\} \cdot \sin\alpha \qquad \text{(Equation 1)}$$

The waveform is switched from the minimum sinusoidal waveform Vvb to the waveform obtained by multiplying the maximum sinusoidal waveform Vub by K at the angle $\alpha$ where the above-mentioned Equation 1 is satisfied. In Equation 1, K is a predetermined value.

Here, a shift quantity SH for connecting the waveform obtained by multiplying the maximum sinusoidal waveform Vub by K to the minimum sinusoidal waveform Vvb is $SH = K \times A \cdot \sin \alpha - A \cdot \sin(\theta - 2\pi/3)$.

Accordingly, $$SH = \left\{\frac{2K+1}{2}\right\} \cdot A\sin\alpha + \left\{\frac{\sqrt{3}}{2}\right\} \cdot A\cos\alpha \qquad \text{[Math. 2]}$$

By substituting Equation 1

$SH = \{2(K_2+K+1)/(2K+1)\} \cdot A \sin \alpha$.

By obtaining the sin α from Equation 1 and substituting it, $$SH = A\sqrt{K^2+K+1} \quad \text{[Math. 3]}$$

That is, the shift quantity SH is shown by the following Equation 2. In Equation 2, K is a predetermined value.

[Math. 4]

$$SH = A\sqrt{K^2+K+1} \quad \text{(Equation 2)}$$

Here, since K and sin α are previously determined design values, they may be stored in a memory of a controller. Accordingly, only the amplitude A is able to be easily calculated for the shift quantity SH by reflecting the control value.

As described above, the waveform of the offset wave OW has a waveform switched from the minimum sinusoidal waveform to the waveform obtained by shifting the waveform obtained by multiplying the maximum sinusoidal waveform by K in the amplitude direction at the angle α where the inclination of the minimum sinusoidal waveform of the sinusoidal waveform of each phase becomes k times the inclination of the maximum sinusoidal waveform of the sinusoidal waveform of each phase. Accordingly, calculation of the offset wave OW is facilitated.

In addition, in the maximum calculation duration T4, the waveform of the offset wave OW is calculated from the predetermined value K, the amplitude A of the sinusoidal waveform, and the value of the maximum sinusoidal waveform. Accordingly, calculation of the offset wave OW is facilitated.

Next, switching timing between the minimum coincidence duration T3 and the maximum calculation duration T4 will be described. When the value of the maximum sinusoidal waveform is max and the value of the minimum sinusoidal waveform is min, max+$A \cdot \sin \alpha$ min+$A \cdot \sin(\alpha - 2\pi/3)$.

$$\min = -\left(\frac{1}{2}\right) \cdot A\sin\alpha - \left\{\frac{\sqrt{3}}{2}\right\} \cdot A\cos\alpha \quad \text{[Math. 5]}$$

By substituting Equation 1,

=$\{(K+2)/(2K+1)\} \cdot A \sin \alpha$.

Accordingly, the switching timing between the minimum coincidence duration T3 and the maximum calculation duration T4 is able to be calculated depending on whether $(K+2)\max+(2K+1)\min$ is positive or negative.

When $(K+2)\max+(2K+1)\cdot\min \geq 0$, the offset wave OW is, $$K \cdot \max - A\sqrt{K^2+K+1} \quad \text{[Math. 6]}$$

When $(K+2)\max+(2K+1)\cdot\min < 0$, the offset wave OW becomes min.

As described above, the switching timing between the minimum coincidence duration T3 and the maximum calculation duration T4 is calculated from the predetermined value K, the value of the maximum sinusoidal waveform, and the value of the minimum sinusoidal waveform. Accordingly, the switching timing between the minimum coincidence duration T3 and the maximum calculation duration T4 is able to be determined.

Next, the output voltage when K and angle α are changed will be described with reference to FIG. 6A to FIG. 9B. FIG. 6A, FIG. 7A, FIG. 8A and FIG. 9A are views showing the sinusoidal waveform Vub, the sinusoidal waveform Vvb, the sinusoidal waveform Vwb and the offset wave OW. FIG. 6B, FIG. 7B, FIG. 8B and FIG. 9B are views showing the output voltage Vu, the output voltage Vv and the output voltage Vw after modulation.

Figure 6A:
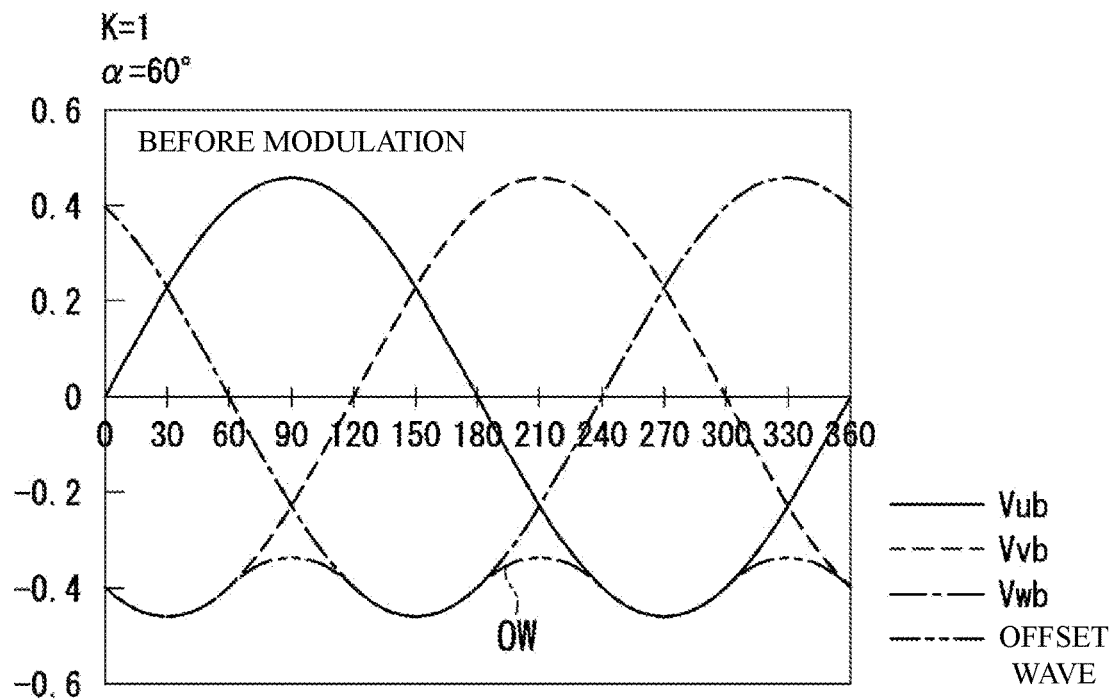
FIG. 6A is a view showing a sinusoidal waveform, a sinusoidal waveform, a sinusoidal waveform and an offset wave.
Figure 6B:
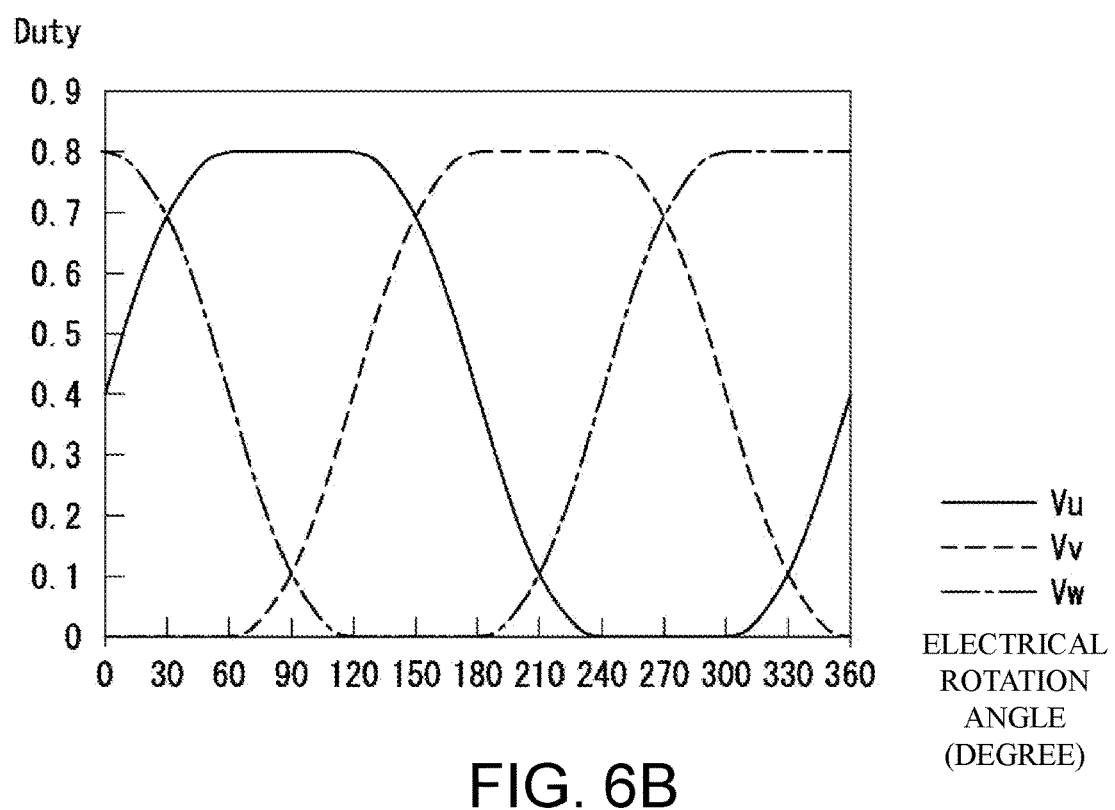
FIG. 6B is a view showing an output voltage, an output voltage and an output voltage after modulation.
Figure 7A:
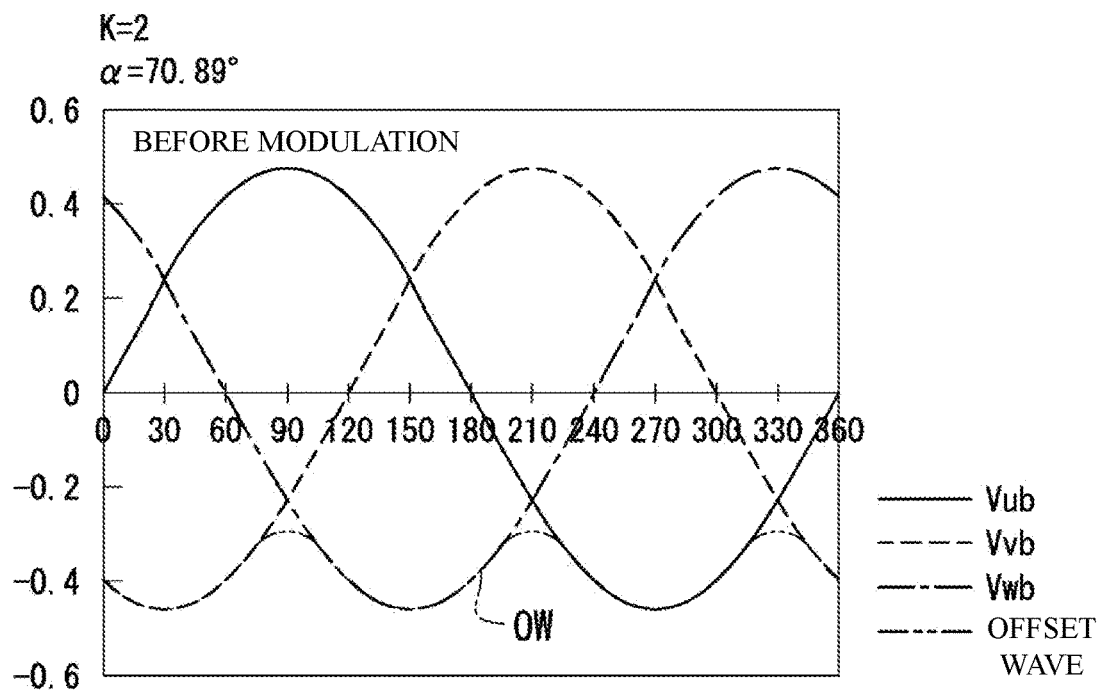
FIG. 7A is a view showing a sinusoidal waveform, a sinusoidal waveform, a sinusoidal waveform and an offset wave.
Figure 7B:
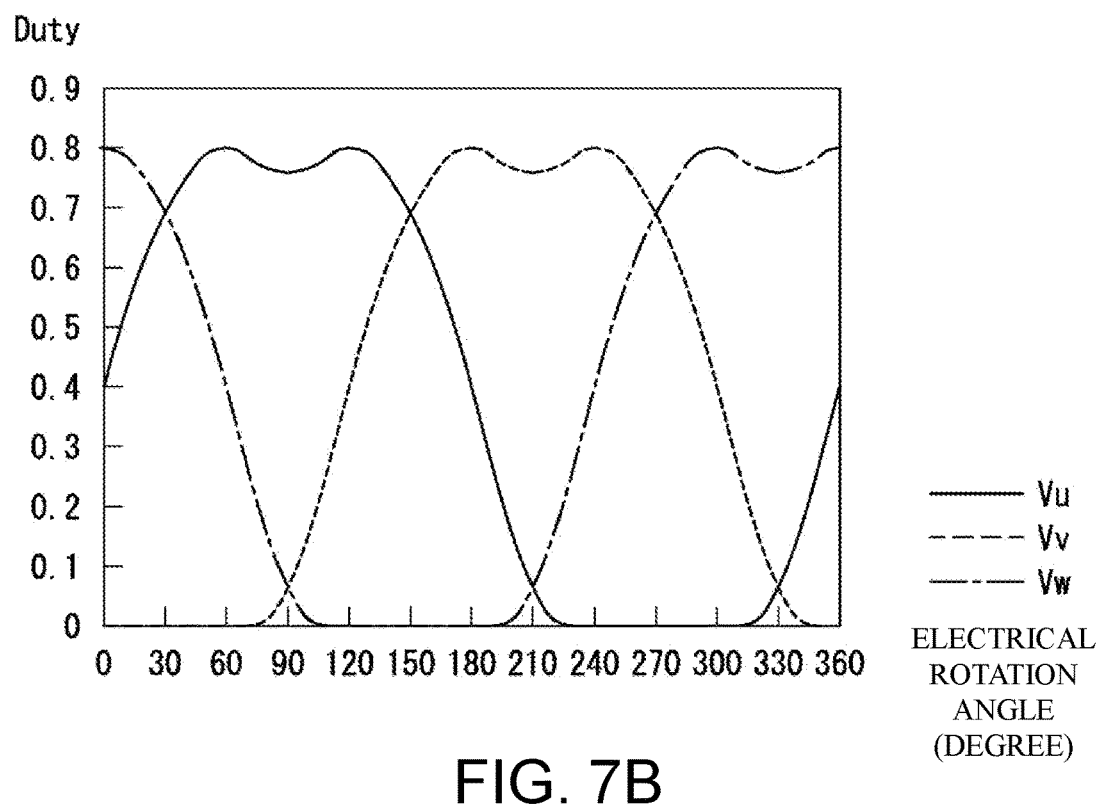
FIG. 7B is a view showing an output voltage, an output voltage and an output voltage after modulation.
Figure 8A:
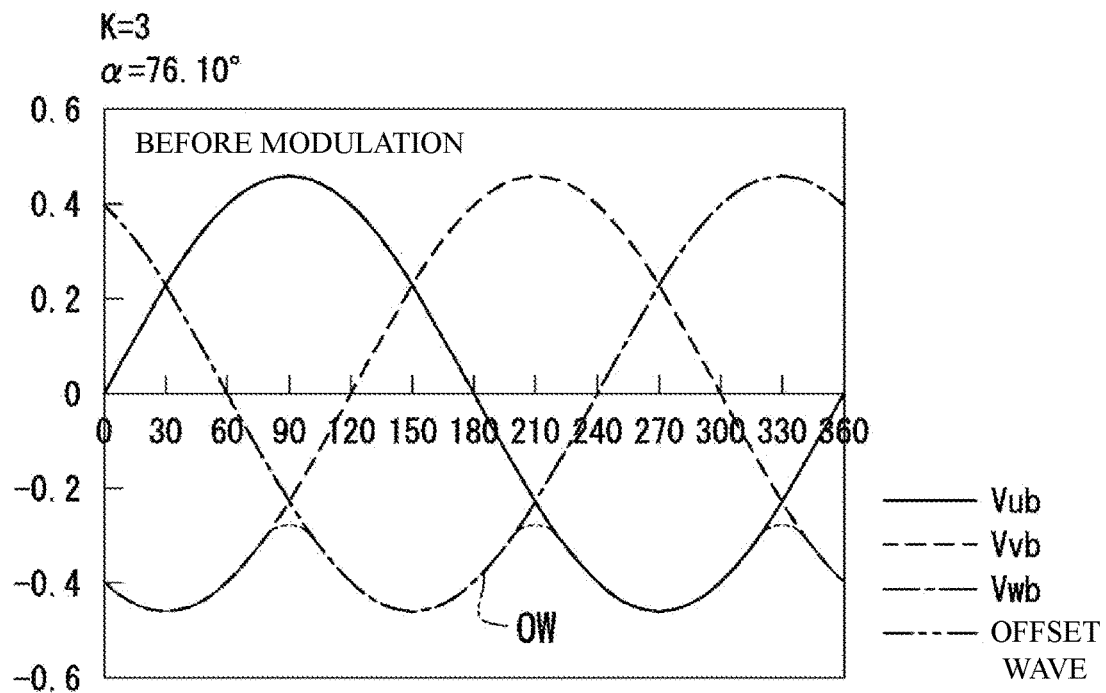
FIG. 8A is a view showing a sinusoidal waveform, a sinusoidal waveform, a sinusoidal waveform and an offset wave.
Figure 8B:
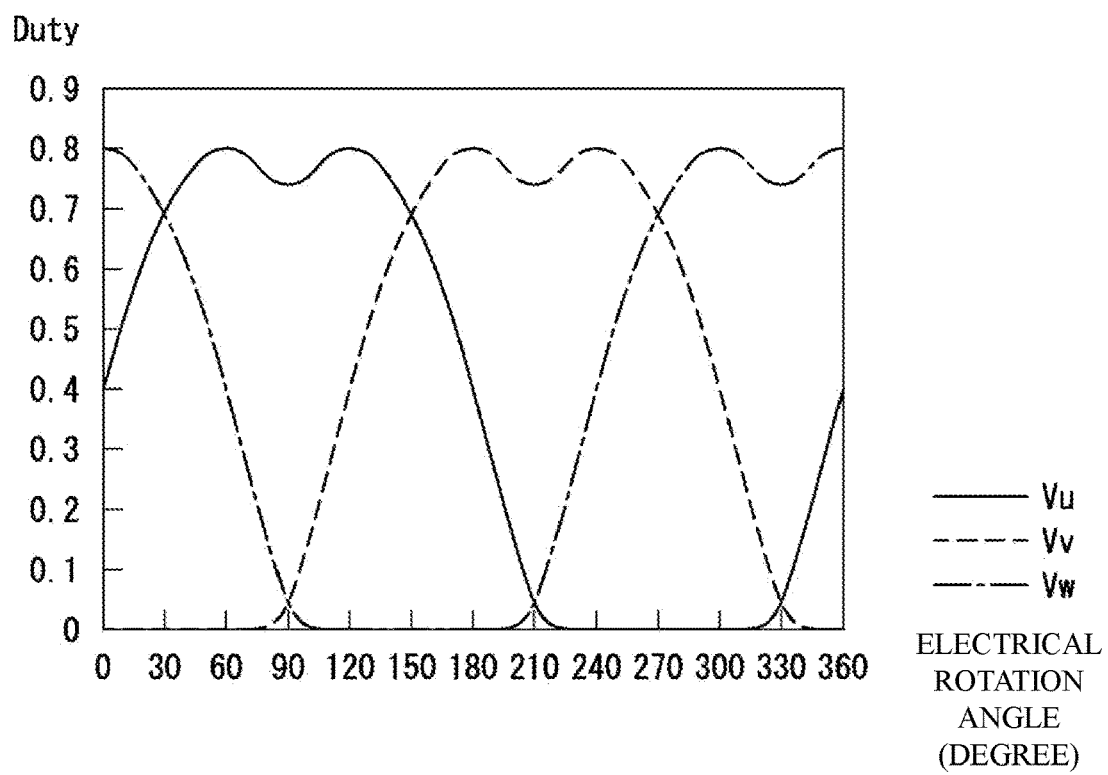
FIG. 8B is a view showing an output voltage, an output voltage and an output voltage after modulation.
Figure 9A:
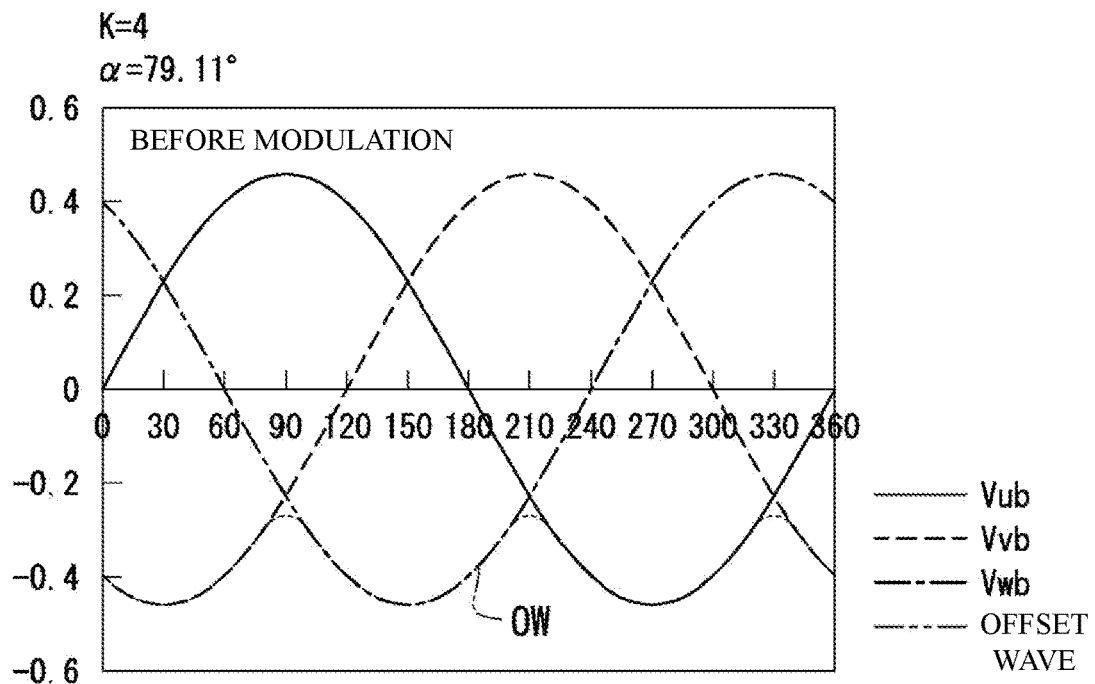
FIG. 9A is a view showing a sinusoidal waveform, a sinusoidal waveform, a sinusoidal waveform and an offset wave.
Figure 9B:
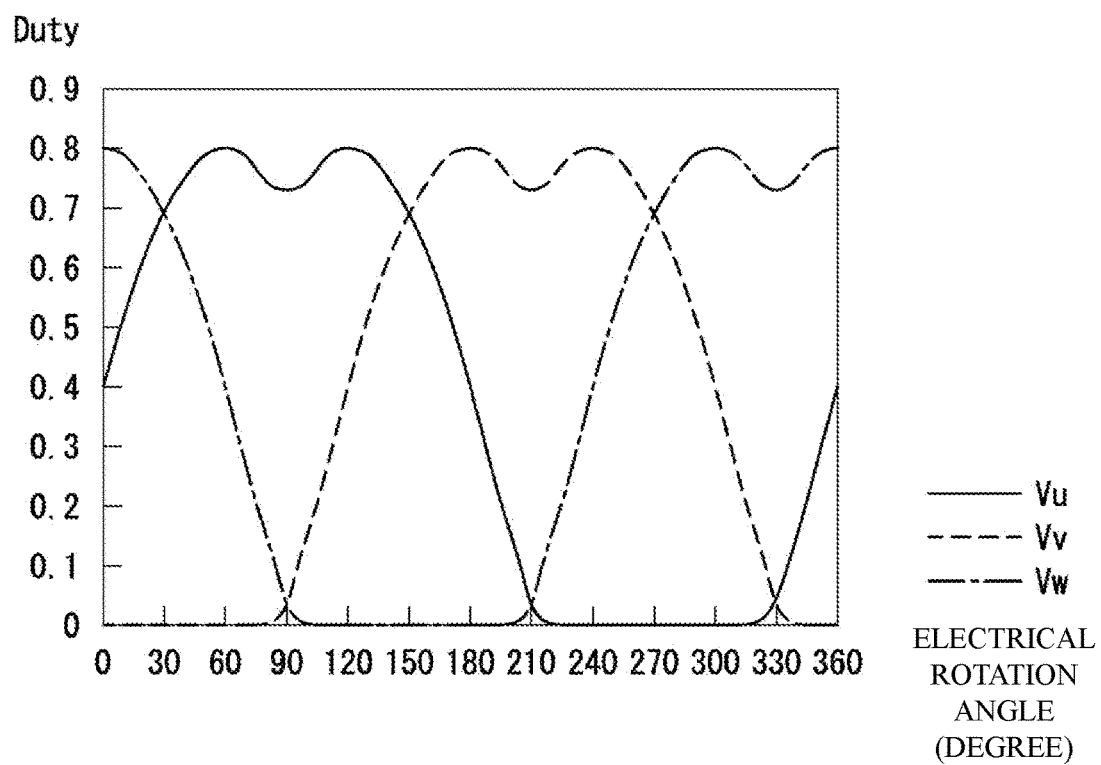
FIG. 9B is a view showing an output voltage, an output voltage and an output voltage after modulation.

FIG. 6A and FIG. 6B show a waveform when K is 1 and the angle α is 60 degrees. FIG. 7A and FIG. 7B show a waveform when K is 2 and the angle is 70.89 degrees. FIG. 8A and FIG. 8B shows a waveform when K is 3 and the angle is 76.10 degrees. FIG. 9A and FIG. 9B shows a waveform when K is 4 and the angle is 79.11 degrees.

The number of switching times of the first semiconductor switching element (the first semiconductor switching element Up, the first semiconductor switching element Vp and the first semiconductor switching element Wp) and the second semiconductor switching element (the second semiconductor switching element Un, the second semiconductor switching element Vn and the second semiconductor switching element Wn) at the output voltage Vu, the output voltage Vv and the output voltage Vw shown in FIG. 6B is 83.3% when the number of switching times of the alternating current output voltage of the three-phase sinusoidal wave is 100%.

The number of switching times of the first semiconductor switching element (the first semiconductor switching element Up, the first semiconductor switching element Vp and the first semiconductor switching element Wp) and the second semiconductor switching element (the second semiconductor switching element Un, the second semiconductor switching element Vn and the second semiconductor switching element Wn) at the output voltage Vu, the output voltage Vv and the output voltage Vw shown in FIG. 7B is 77.3% when the number of switching times of the alternating current output voltage of the three-phase sinusoidal wave is 100%.

The number of switching times of the first semiconductor switching element (the first semiconductor switching element Up, the first semiconductor switching element Vp and the first semiconductor switching element Wp) and the second semiconductor switching element (the second semiconductor switching element Un, the second semiconductor switching element Vn and the second semiconductor switching element Wn) at the output voltage Vu, the output voltage Vv and the output voltage Vw shown in FIG. 8B is 74.4% when the number of switching times of the alternating current output voltage of the three-phase sinusoidal wave is 100%.

The number of switching times of the first semiconductor switching element (the first semiconductor switching element Up, the first semiconductor switching element Vp and the first semiconductor switching element Wp) and the second semiconductor switching element (the second semiconductor switching element Un, the second semiconductor switching element Vn and the second semiconductor switching element Wn) at the output voltage Vu, the output voltage Vv and the output voltage Vw shown in FIG. 9B is 72.7% when the number of switching times of the alternating current output voltage of the three-phase sinusoidal wave is 100%.

K is preferably 1 or more. The voltage utilization factor equivalent to the normal two-phase modulation is able to be obtained when K is 1 or more. In addition, as the k value is increased, the duration in which one phase is not switched is able to be increased, and the number of switching times is able to be reduced.

In addition, K is preferably 1. When K is 1, even-order harmonics are no longer included, and harmonic waves are able to be further suppressed. Accordingly, torque non-uniformity is able to be suppressed.

In the example described with reference to FIG. 1 to FIG. 9B, in the one-phase fixed duration T2, it may be the output voltage waveform that is continuously off, but the present invention is not limited to this. For example, in the one-phase fixed duration T2, it may be the output voltage waveform that is continuously on.

Figure 10:
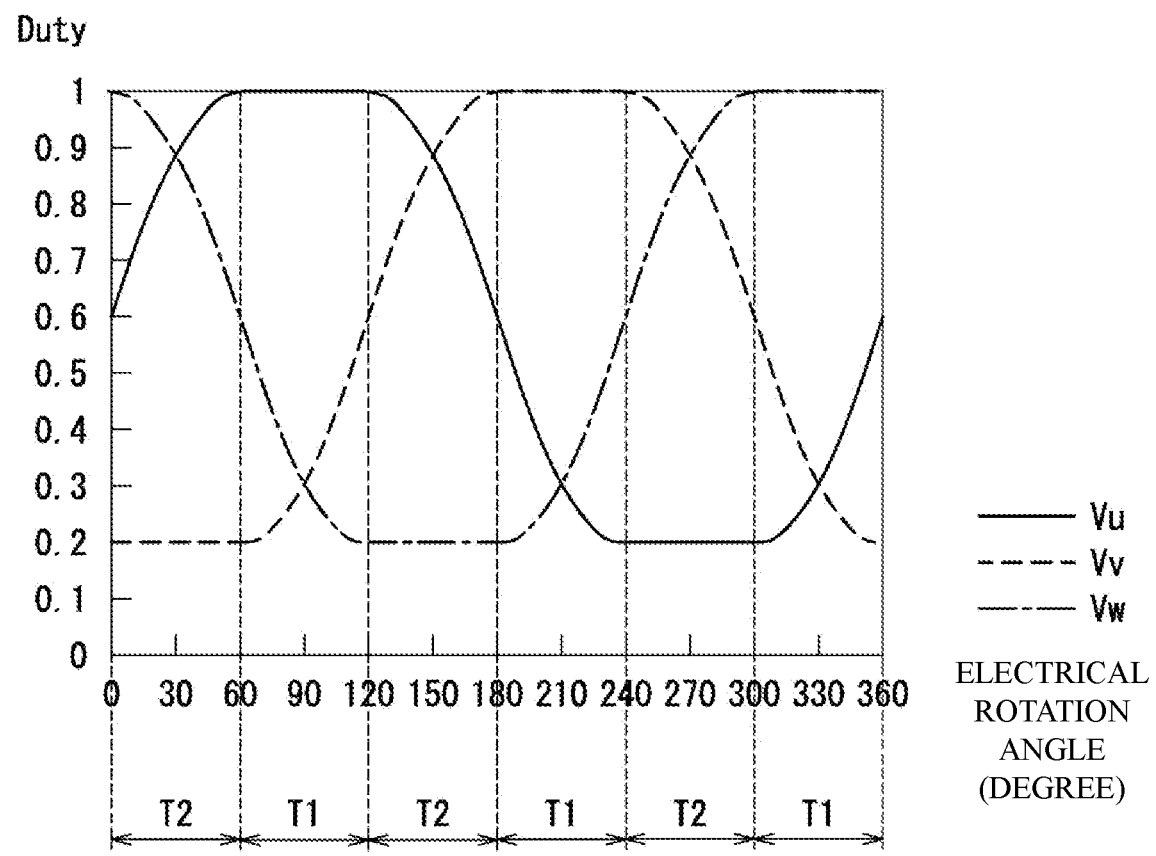
FIG. 10 is a view showing an output voltage, an output voltage and an output voltage.

Another example of the output voltage waveform will be described with reference to FIG. 10. FIG. 10 is a view showing the output voltage Vu, the output voltage Vv and the output voltage Vw. Description of parts overlapping the example described with reference to FIG. 1 to FIG. 9B will be omitted.

As shown in FIG. 10, the total switching duration T1 and the one-phase fixed duration T2 are provided during one cycle of the alternating current output. In the one-phase fixed duration T2, one phase is continuously on.

Figure 11A:
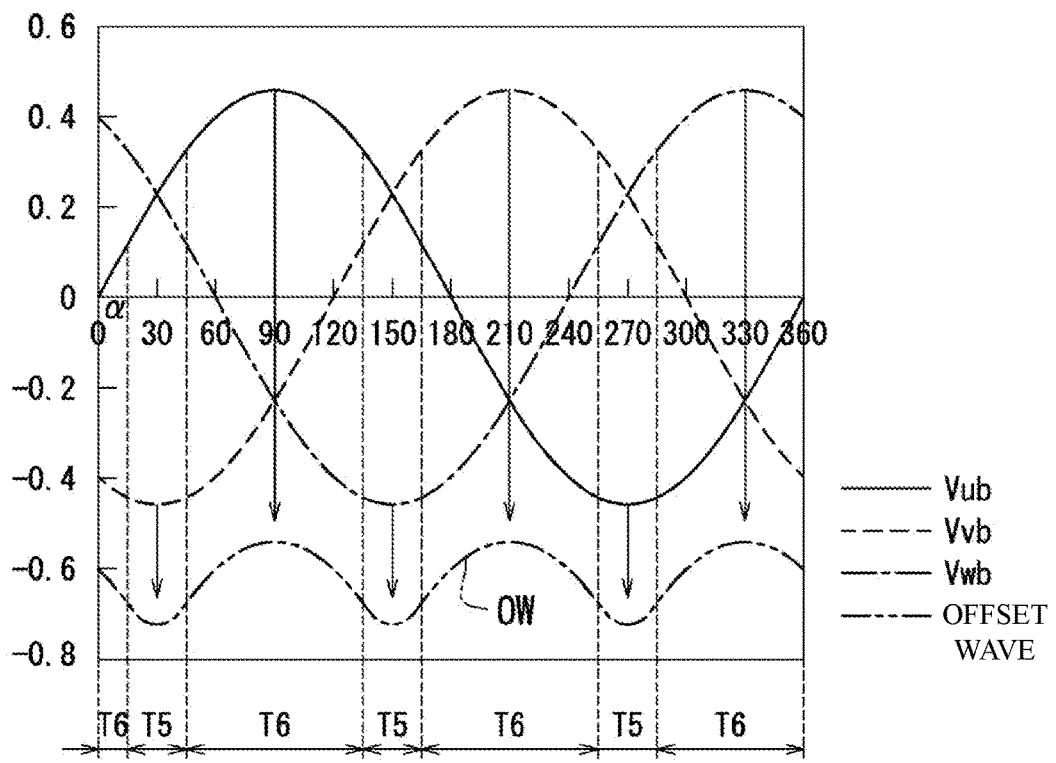
FIG. 11A is a view showing a sinusoidal waveform, a sinusoidal waveform, a sinusoidal waveform and an offset wave.
Figure 11B:
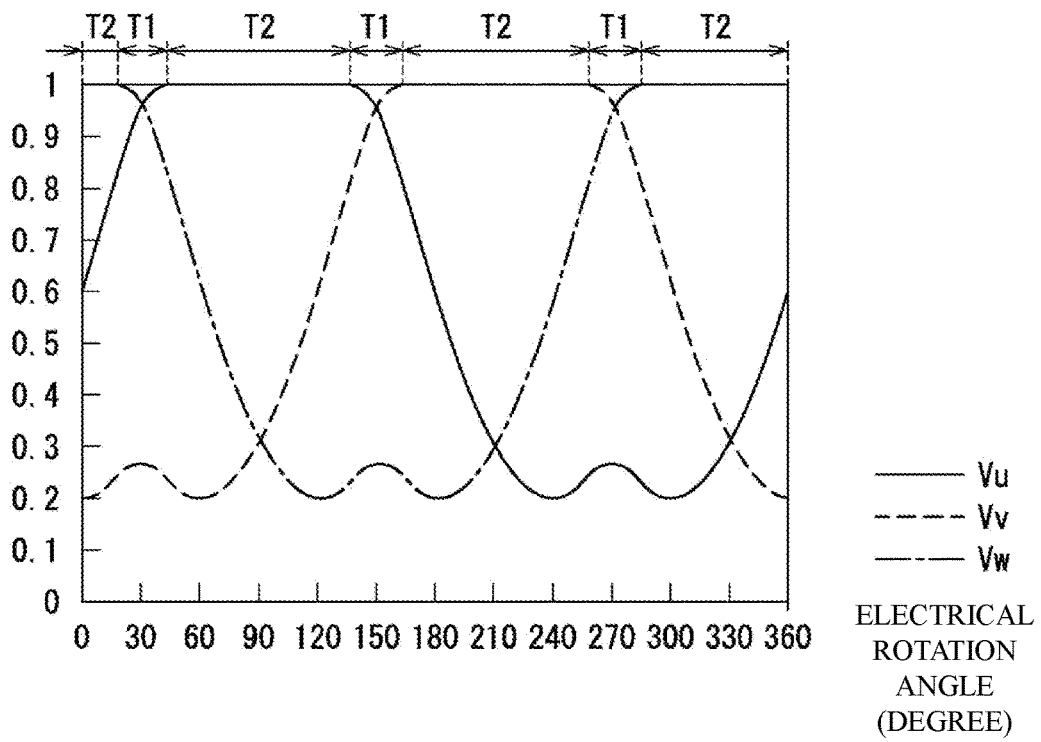
FIG. 11B is a view showing an output voltage, an output voltage and an output voltage after modulation.

The output voltage will be further described with reference to FIG. 11A and FIG. 11B. FIG. 11A is a view showing the sinusoidal waveform Vub, the sinusoidal waveform Vvb, the sinusoidal waveform Vwb and the offset wave OW. FIG. 11B is a view showing the output voltage Vu, the output voltage Vv and the output voltage Vw after modulation.

As shown in FIG. 11A, the offset wave OW coincides with a waveform obtained by shifting a one-phase sinusoidal waveform in the amplitude direction in the one-phase fixed duration T2. Note that the offset wave OW may not completely coincide with the waveform obtained by shifting the one-phase sinusoidal waveform in the amplitude direction in the one-phase fixed duration T2. For example, the offset wave OW may be slightly deviated from the waveform obtained by shifting the one-phase sinusoidal waveform in the amplitude direction in the one-phase fixed duration T2.

The waveform of the offset wave OW has a minimum calculation duration T5 and a maximum coincidence duration T6.

In the minimum calculation duration T5, the waveform of the offset wave OW is calculated from the minimum sinusoidal waveform of the sinusoidal waveform of each phase. In the embodiment, specifically, in the minimum calculation duration T5, the electrical rotation angles are 15 degrees to 45 degrees, 135 degrees to 165 degrees and 255 degrees to 285 degrees. In the embodiment, the minimum calculation duration T5 is the same duration as the total switching duration T1.

Specifically, when the electrical rotation angle is 15 degrees to 45 degrees, the offset wave OW is calculated from the minimum sinusoidal waveform Vvb of the sinusoidal waveform of each phase. More specifically, when the electrical rotation angle is 15 degrees to 45 degrees, the offset wave OW is a waveform obtained by shifting the waveform obtained by multiplying the minimum sinusoidal waveform Vvb of the sinusoidal waveform of each phase by K by $1-A\sqrt{(K^2+K+1)}$. A is amplitude. K is a predetermined value.

When the electrical rotation angle is 135 degrees to 165 degrees, the offset wave OW is calculated from the minimum sinusoidal waveform Vwb of the sinusoidal waveform of each phase. More specifically, when the electrical rotation angle is 135 degrees to 165 degrees, the offset wave OW is a waveform obtained by shifting the waveform obtained by multiplying the minimum sinusoidal waveform Vwb of the sinusoidal waveform of each phase by K by $1-A\sqrt{(K^2+K+1)}$. A is amplitude. K is a predetermined value.

When the electrical rotation angle is 255 degrees to 285 degrees, the offset wave OW is calculated from the minimum sinusoidal waveform Vub of the sinusoidal waveform of each phase. More specifically, when the electrical rotation angle is 255 degrees to 285 degrees, the offset wave OW is a waveform obtained by shifting the waveform obtained by multiplying the minimum sinusoidal waveform Vub of the sinusoidal waveform of each phase by K by $1-A\sqrt{(K^2+K+1)}$. A is amplitude. K is a predetermined value.

In the maximum coincidence duration T6, the waveform of the offset wave OW coincides with a waveform obtained by shifting the maximum sinusoidal waveform of the sinusoidal waveform of each phase in the amplitude direction. Specifically, in the maximum coincidence duration T6, the waveform coincides with a waveform obtained by shifting the maximum sinusoidal waveform of the sinusoidal waveform of each phase in the amplitude direction. In the embodiment, in the maximum coincidence duration T6, the electrical rotation angles are 0 degree to 15 degrees, 45 degrees to 135 degrees, 165 degrees to 255 degrees and 285 degrees to 360 degrees. In the embodiment, the maximum coincidence duration T6 is the same duration as the one-phase fixed duration T2. Specifically, when the electrical rotation angle is 0 degree to 15 degrees, the offset wave OW coincides with a waveform obtained by shifting the sinusoidal waveform Vwb, which is the maximum sinusoidal waveform of each phase, in the amplitude direction. When the electrical rotation angle is 45 degrees to 135 degrees, the offset wave OW coincides with the waveform obtained by shifting the sinusoidal waveform Vub, which is the maximum sinusoidal waveform of each phase, in the amplitude direction. When the electrical rotation angle is 165 degrees to 255 degrees, the offset wave OW coincides with a waveform obtained by shifting the sinusoidal waveform Vvb, which is the maximum sinusoidal waveform of each phase, in the amplitude direction. When the electrical rotation angle is 285 degrees to 360 degrees, the offset wave OW coincides with a waveform obtained by shifting the sinusoidal waveform Vwb, which is the maximum sinusoidal waveform of each phase, in the amplitude direction.

Hereinabove, as described above, the waveform of the offset wave OW has the minimum calculation duration T5 and the maximum coincidence duration T6. In the minimum calculation duration T5, the waveform of the offset wave OW is calculated from the minimum sinusoidal waveform of the sinusoidal waveform of each phase. In the maximum coincidence duration T6, the waveform of the offset wave OW coincides with a waveform obtained by shifting the maximum sinusoidal waveform of the sinusoidal waveform of each phase in the amplitude direction. Accordingly, calculation of the offset wave OW is facilitated.

In addition, the waveform of the offset wave OW has a waveform switched from the waveform obtained by shifting the maximum sinusoidal waveform in the amplitude direction to the waveform obtained by shifting the waveform obtained by multiplying the minimum sinusoidal waveform by K in the amplitude direction at the angle α where the inclination of the maximum sinusoidal waveform of the sinusoidal waveform of each phase is K times the inclination of the minimum sinusoidal waveform of the sinusoidal waveform of each phase. Accordingly, calculation of the offset wave OW is facilitated.

In the minimum calculation duration T5, the waveform of the offset wave OW is calculated from the predetermined value K, the amplitude of the sinusoidal waveform, and the value of the minimum sinusoidal waveform. Accordingly, calculation of the offset wave OW is facilitated.

The switching timing of the maximum coincidence duration T6 and the minimum calculation duration T5 is calculated from the predetermined value K, the value of the maximum sinusoidal waveform, and the value of the minimum sinusoidal waveform. Specifically, the switching timing of the maximum coincidence duration T6 and the minimum calculation duration T5 is able to be calculated depending on whether (K+2)min+(2K+1)·max is positive or negative.

Provided that the value of the maximum sinusoidal waveform is max, the value of the minimum sinusoidal waveform is min, the predetermined value is K, and the amplitude is A, when $(K+2)\text{min}+(2K+1)\cdot\text{max} \geq 0$, the offset wave OW is max−1.

when $(K+2)\text{min}+(2K+1)\cdot\text{max} < 0$, the offset wave OW is $$K\cdot\text{min}-A\sqrt{K^2+K+1}$$ [Math. 7]

Accordingly, the switching timing of the maximum coincidence duration T6 and the minimum calculation duration T5 is able to be determined.

Hereinabove, the embodiment of the present invention has been described with reference to the accompanying drawings (FIG. 1 to FIG. 11B). However, the present invention is not limited to the above-mentioned embodiment, and is able to be implemented in various forms without departing from the spirit of the invention. In order to make the drawings easier to understand, the drawings mainly show each component schematically, and the thickness, length, number, etc. of each component illustrated differ from the actual ones for the convenience of drawing. In addition, the materials, shapes, dimensions, etc. of each component shown in the above embodiment are examples, and are not particularly limited, and various changes are possible within the scope that does not substantially deviate from the effects of the present invention.

Although the motor drive circuit 100 described with reference to FIGS. 1 to 11B outputs three-phase alternating current output, the present invention is not limited to this. For example, the motor drive circuit 100 may output four or more phases of alternating current output. For example, the motor drive circuit 100 may drive a 5-phase motor M by outputting five-phase alternating current output.

The present invention is able to be suitably used for an inverter circuit and a motor module, for example.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. An inverter circuit which outputs three or more phases of alternating current output, the inverter circuit comprising:
   at least three output terminals which output three or more phases of output voltage and three or more phases of output current;
   a first input terminal to which a first voltage is applied;
   a second input terminal to which a second voltage lower than the first voltage is applied; and
   at least three series bodies to which two semiconductor switching elements are connected in series,
   wherein the at least three series bodies are connected to each other in parallel,
   each of the at least three series bodies has one end connected to the first input terminal and the other end connected to the second input terminal,
   each of the at least three series bodies has:
   a first semiconductor switching element connected to the first input terminal; and
   a second semiconductor switching element connected to the second input terminal,
   the first semiconductor switching element and the second semiconductor switching element are connected at a connection point,
   the connection point in each of the at least three series bodies is connected to the at least three output terminals,
   the first semiconductor switching element is switched on and off at a frequency higher than a frequency of the alternating current output,
   the second semiconductor switching element is switched on and off at a frequency higher than the frequency of the alternating current output,
   a duration of one cycle of the alternating current output is provided with:
   a total switching duration in which, in all phases, at least one of the first semiconductor switching element and the second semiconductor switching element is switched; and
   a one-phase fixed duration in which one of the first semiconductor switching element and the second semiconductor switching element of one phase is fixed to be off and the other is fixed to be on, and at least one of the first semiconductor switching element and the second semiconductor switching element is switched in a phase other than the one phase,
   a waveform of the output voltage of each phase is a waveform obtained by subtracting a common offset wave from a sinusoidal waveform,
   a waveform of the offset wave coincides with a sinusoidal waveform of the one phase or coincides with a waveform obtained by shifting the sinusoidal waveform of the one phase in an amplitude direction in the one-phase fixed duration, and
   in switching of the total switching duration and the one-phase fixed duration, an inclination of the waveform of the offset wave is continuously varied or the inclination is constant.

2. The inverter circuit according to claim 1, wherein a cycle of the offset wave is 1/n of a cycle of the sinusoidal waveform, where n is the number of phases of the alternating current output.

3. The inverter circuit according to claim 2, wherein the waveform of the offset wave has:
   a minimum coincidence duration that coincides with a minimum sinusoidal waveform of the sinusoidal waveform of each phase; and
   a maximum calculation duration calculated from a maximum sinusoidal waveform of the sinusoidal waveform of each phase.

4. The inverter circuit according to claim 3, wherein the waveform of the offset wave has a waveform switched from the minimum sinusoidal waveform to a waveform obtained by shifting a waveform obtained by multiplying the maximum sinusoidal waveform by K in an amplitude direction, at an angle $\alpha$ where an inclination of the minimum sinusoidal waveform of the sinusoidal waveform of each phase is K times an inclination of the maximum sinusoidal waveform of the sinusoidal waveform of each phase.

5. The inverter circuit according to claim 4, wherein, in the maximum calculation duration, the waveform of the offset wave is calculated from K which is a predetermined value, an amplitude of the sinusoidal waveform, and a value of the maximum sinusoidal waveform.

6. The inverter circuit according to claim 5, wherein a switching timing of the minimum coincidence duration and the maximum calculation duration is calculated from K which is a predetermined value, a value of the maximum sinusoidal waveform, and a value of the minimum sinusoidal waveform.

7. The inverter circuit according to claim 2, wherein the waveform of the offset wave has:
   a minimum calculation duration calculated from a minimum sinusoidal waveform of the sinusoidal waveform of each phase; and
   a maximum coincidence duration that coincides with a waveform obtained by shifting a maximum sinusoidal waveform of the sinusoidal waveform of each phase in an amplitude direction.

8. The inverter circuit according to claim 7, wherein the waveform of the offset wave has a waveform switched from a waveform obtained by shifting the maximum sinusoidal waveform in the amplitude direction to a waveform obtained by shifting a waveform obtained by multiplying the minimum sinusoidal waveform by K in the amplitude direction, at an angle $\alpha$ where an inclination of the maximum sinusoidal waveform of the sinusoidal waveform of each phase is K times an inclination of the minimum sinusoidal waveform of the sinusoidal waveform of each phase.

9. The inverter circuit according to claim 8, wherein, in the minimum calculation duration, the waveform of the offset wave is calculated from K which is a predetermined value, an amplitude of the sinusoidal waveform, and a value of the minimum sinusoidal waveform.

10. The inverter circuit according to claim 9, wherein a switching timing of the maximum coincidence duration and the minimum calculation duration is calculated from K which is a predetermined value, a value of the maximum sinusoidal waveform, and a value of the minimum sinusoidal waveform.

11. The inverter circuit according to claim 4, wherein K is 1 or more.

12. The inverter circuit according to claim 11, wherein K is 1.

13. A motor module comprising:
   the inverter circuit according to claim 1; and
   an n-phase motor driven by the inverter circuit.

* * * * *